United States Patent Office 3,079,953
Patented Mar. 5, 1963

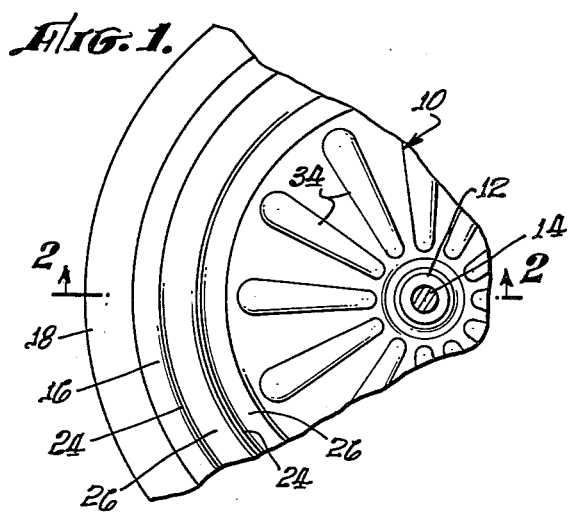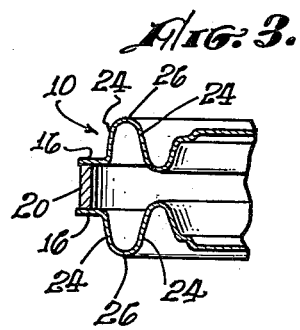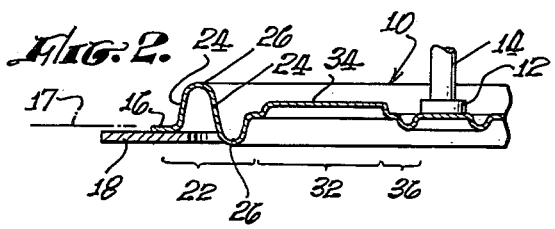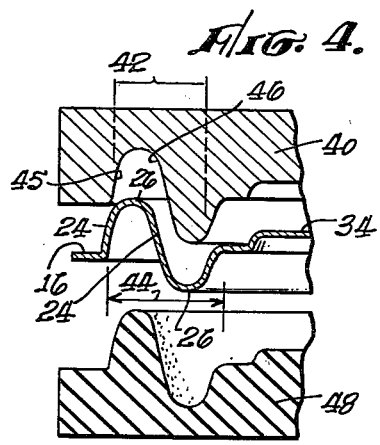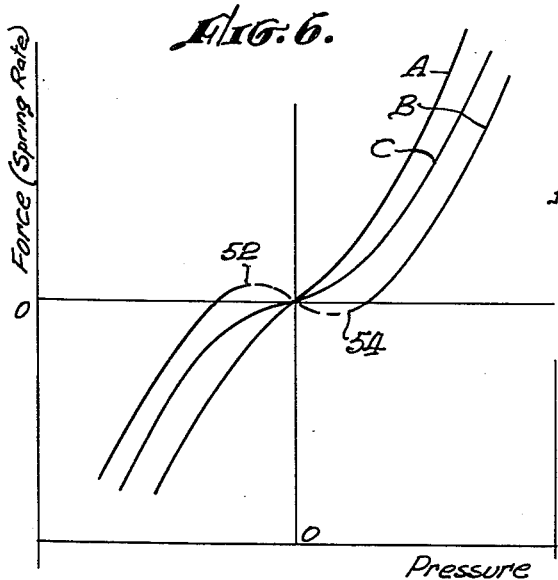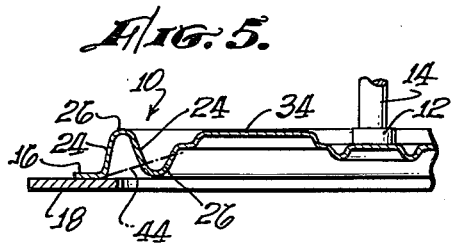
Carlyle A. Mounteer,
INVENTOR.

3,079,953
PRESSURE RESPONSIVE ELEMENT
Carlyle A. Mounteer, Pasadena, Calif., assignor to Giannini Controls Corporation, Duarte, Calif., a corporation of New York
Filed Mar. 19, 1962, Ser. No. 180,708
4 Claims. (Cl. 137—793)

This invention has to do generally with pressure responsive diaphragms and capsules. More particularly, it concerns methods for producing such pressure responsive elements having desirable response characteristics, and the elements so produced.

In the previous art of making pressure responsive diaphragms from resilient material such as sheet metal, a primary objective has been to obtain linear operation throughout the working range of pressure. A primary object of the present invention, on the other hand, is to provide a diaphragm of durable material having a non-linear characteristic such that the spring rate within a small but appreciable range of deflection may be made substantially zero.

Such diaphragms, and the capsules that may be constructed from them, are particularly useful, for example, in instruments of null type, in which the force produced by the input pressure is balanced by an opposing force of controlled magnitude. That force is typically developed under control of a servo system in response to very small deflections of the pressure sensing element from an equilibrium, or null, position. By providing a pressure element having substantially zero spring rate close to null position, the present invention permits the servo-produced balance force to correspond directly to the pressure condition, without perturbation by the spring force of the pressure sensing element or other resilient member.

A further object of the invention is to provide a diaphragm configuration that is capable of relatively large deflections without substantial change of the effective diameter of the element.

A full understanding of the invention, and of its further objects and advantages, will be had from the following description of certain illustrative manners of carrying it out, of which description the accompanying drawings form a part. The particulars of that description are intended only as illustration, and not as a limitation upon the scope of the invention, which is defined in the appended claims.

In the drawings:

FIG. 1 is a fragmentary plan, representing an illustrative diaphragm in accordance with the invention;

FIG. 2 is a section on the line 2—2 of FIG. 1;

FIG. 3 is a fragmentary section, illustrating a capsule in accordance with the invention;

FIG. 4 is a schematic section, representing an illustrative method of the invention;

FIG. 5 is a section illustrating operation of the invention; and

FIG. 6 is a graph representing response characteristics of illustrative pressure responsive elements in accordance with the invention.

In the illustrative form of the invention shown in FIGS. 1 and 2, a diaphragm is represented generally at 10, formed of thin sheet metal, such as beryllium copper, for example. The material can be typically only a few thousandths of an inch thick, the thickness being exaggerated in the figures for clarity of illustration. A suitable fitting 12 is mounted at the center of the diphragm in conventional manner, as by spot-welding or solder, to which may be connected any desired actuating or mounting element, represented illustratively by the rod 14. The outer periphery of the diaphragm comprises typically a flange 16 which lies essentially in the plane of the diaphragm, represented schematically at 17. Flange 16 facilitates mounting of the diaphragm, for example in a circular aperture in a plate 18, as indicated in FIG. 2. Alternatively, two diaphragms 10 and 10a may be assembled by means of a cylindrical spacer 20 to form a capsule unit, as indicated in FIG. 3.

In accordance with one aspect of the invention, diaphragm 10 comprises a radially outer flexible portion 22, which is deeply convoluted circumferentially. As seen in section in FIG. 2, the convolutions at 22 comprise the transverse portions 24, joined by the web portions 26 lying generally parallel to the plane of the diaphragm. The convolutions are typically of such depth that at least one transverse portion 24 is substantially perpendicular to the plane of the diaphragm. As illustrated, the transverse and web portions of convolutions 22 are joined smoothly by curves, producing an overall form approximating a sinusoidal curve. Alternate excursions of that curve lie substantially on opposite sides of plane 17 of the diaphragm. The convolutions comprise preferably an even number of such excursions, two being shown illustratively, and typically occupy approximately 20 percent of the total radius of the diaphragm.

Radially inward of convolutions 22, diaphragm 10 has an annular region 32, typically occupying approximately 40 percent of the total radius, that is formed in such a way as to be substantially stiff against radial deformation. Such stiffness is obtained in the present instance by means of radial convolutions 34. Convolutions 34 also stiffen the diaphragm against transverse deformation, causing diaphragm portion 32 to act substantially as a rigid unit.

Annular portion 32 is preferably separated from fitting 12 by an inner flexible portion, represented at 36, which is typically convoluted circumferentially in conventional manner, and illustratively occupies about 10 percent of the radius. The flexibility of portion 36 permits effectively independent rotational movement of rod 14 and portion 32 of the diaphragm through the very small angles usually involved in operation of the mechanism to which the diaphragm is typically connected.

Diaphragms of the described general form can be fabricated by the usual procedures, such as pressing a flat sheet of suitable material into an appropriately shaped die. The material is then heat treated to relieve stresses produced by the forming operation and to harden the material and produce the desired degree of resiliency. Details of such heat treatment depend in known manner upon the type of material used and the desired characteristics of the finished product. A formed diaphragm of beryllium copper may, for example, be annealed at about 250° F. for approximately 16 hours and then heated to about 625° F. for about 2½ hours to harden the material by modification of the crystal structure (precipitation hardening). Alternatively, a single heating step is frequently employed to perform both functions of stress relieving and precipitation hardening.

The described form of diaphragm, as thus far described, has the outstanding advantage that it can be deflected through an appreciable distance normal to plane 17 without altering its effective area. That provides improved linearity of operation at relatively large deflections.

In accordance with a further aspect of the invention, a diaphragm having the general form described may be treated in novel manner to provide a selected type of non-linear response at small deflections. More particularly, that response may be adjusted to provide substantially zero spring rate in the region immediately adjacent to zero deflection.

That is accomplished by treating the diaphragm, after its preliminary forming, and preferably after heat treatment, which may be of conventional type, to reduce the diameter of the extreme peripheral portion of the diaphragm. Such reduction of the peripheral diameter may be accomplished by a wide variety of different operational steps. For example, an auxiliary die may be provided, as indicated schematically at 40 in FIG. 4, the radially inner portion of which typically corresponds to the die in which the diaphragm was originally formed. The radially outer portion of die 40, indicated typically at 42, is reduced in diameter. That reduction is typically quite small in actual practice, but is exaggerated in the drawings for clarity of illustration. When the diaphragm is forced into die 40, as by a suitably shaped ram 48 of hard rubber, for example, the flexibility of the deep outer corrugations permits them to be deflected radially inward with little or no permanent deformation of the metal; but the flat peripheral flange 16 has no such flexibility, and is permanently deformed by an amount nearly equal to the total compression produced by the die. After removal from die 40, the diaphragm is therefore in a stressed condition, the convolutions at 22 being under radial compression between the relatively stiff annular portion 32, which still retains its initial size, and the relatively stiff peripheral flange 16, which has been reduced in diameter. That compression may be represented as a reduction in the dimension 44 from its initial value to a compressed value, the latter substantially corresponding to the dimensions of die 40.

With the diaphragm in the described stressed condition, deformation of the diaphragm in response to differential pressure on its opposite faces tends to relieve that stress, since the distance 44 is increased by such deformation, as represented in schematic and exaggerated form in FIG. 5. Such stress relief lowers the potential energy of the system, tending to make the deformed condition more stable than the plane condition of the diaphragm. However, the deformation not only relieves the stress of radial compression, but introduces a distinct stress due to the transverse deflection of the metal comprising convolutions 22. By suitable selection of the degree of radial compression that is introduced, the transverse stress produced by initial diaphragm deflection may be substantially balanced by the relief of radial compressional stress that results from the same deflection. Under that condition, the potential energy of the diaphragm is substantially unchanged by small deflection from plane condition. The diaphragm then does not tend to resist such deflection, and the spring rate for such deflection is effectively substantially zero.

If deflection continues beyond the magnitude required to substantially relieve the radial stress initially present, the increasing transverse stress caused by deformation is no longer compensated, and the diaphragm response at higher deflections is typically substantially linear. FIG. 6 shows illustrative response curves for diaphragms made in accordance with the present aspect of the invention, having spring rates for small deflections that are abnormally small. Curve A corresponds to a diaphragm in which the peripheral compression is relatively slight, the spring rate for small deflections being reduced by a factor of about two relative to the spring rate for large deflections. Curve B corresponds to a diaphragm in which the peripheral compression is great enough to produce an unstable condition at deflections between 52 and 54, the diaphragm tending to snap over spontaneously from any intermediate position to one or other of those limiting stable positions. Curve C corresponds to a diaphragm in which the degree of peripheral compression is just sufficient to make the spring rate substantially zero at zero deflection, the diaphragm being then free to move in either direction through a small distance in response to an extremely small applied force. That preferred type of action may be obtained by reducing the diameter of the diaphragm periphery by an appropriate ratio, typically from about 0.1 to about 1.0 percent. The amount of compression can be adjusted accurately for each individual type of diaphragm, for example by compressing a diaphragm in a die of the general form shown at 40 and testing the response characteristic of the resulting diaphragm. The degree of compression can then be varied slightly, as may be required, for example by grinding off the die surface in the region indicated at 45 and by raising the surface by plating in the region 46 if less compression is needed; and by the opposite operations if more compression is needed. Once a satisfactory treating die is obtained, diaphragms having a non-linear characteristic of the desired type can be reliably and economically produced.

I claim:

1. A pressure responsive element comprising a metal diaphragm having an annular portion that is substantially stiff against radial deformation, and having radially outward thereof a portion that is deeply convoluted circumferentially and that is under compression in a radial direction.

2. A pressure responsive element comprising a generally circular, axially deflectable metal diaphragm having an annular portion that is deeply convoluted circumferentially and has a normal radial dimension when unrestrained, means defining the radius of the inner edge of said portion, and means defining the radius of the outer edge of said portion, the difference between said radii when the diaphragm is undeflected being less than said normal radial dimension of the annular portion.

3. A pressure responsive element comprising a generally circular, axially deflectable metal diaphragm having an annular portion that is readily deformable radially and transversely and has a normal radial dimension when unrestrained, and means defining the radii of the inner and outer edges of said portion, the difference between said radii when the diaphragm is undeflected being less than said normal radial dimension of the annular portion, whereby the diaphragm has substantially zero spring rate for small deflections.

4. A pressure responsive element comprising a metal diaphragm having an inner portion that is substantially stiff against radial deformation, a peripheral flange that is substantially stiff against radial deformation, and a deeply convoluted annular portion between said inner portion and said flange, said annular portion being radially compressed.

References Cited in the file of this patent

UNITED STATES PATENTS 1,921,312    Eichholz   ----------- Aug. 8, 1933